Inventor
Lucien Péras
By Stevens, Davis, Miller & Mosher
Attorneys

3,193,041
**DEVICES FOR PRESERVING THE FLUID-TIGHT-
NESS OF HYDRAULIC COOLING CIRCUITS OF
AUTOMOBILE ENGINES**
Lucien Péras, Billancourt, France, assignor to Regie Nationale des Usines Renault, Billancourt, France
Filed June 25, 1962, Ser. No. 205,056
Claims priority, application France, Aug. 23, 1961,
871,420, Patent 80,507
3 Claims. (Cl. 180—68)

In application Ser. No. 93,783 filed March 6, 1961 now Patent No. 3,083,701 issued April 2, 1963, applicant describes a device for preserving the fluid-tightness of the hydraulic cooling circuit of automobile engines, which consists in connecting said circuit to an expansion vessel disposed at a cooled point of the vehicle which is located at a lower level than the uppermost point of the circuit.

According to a specific form of embodiment of this invention, said expansion vessel is of the constant volume type and comprises a safety valve.

It is the essential object of the present invention, to provide a specific application of this form of embodiment whereby the expansion vessel is disposed within one of the wings adjacent to the engine (that is, a front wing in the case of a front engine and a rear wing in the case of a rear-engined vehicle), in the upper portion of this wing and behind the relevant road wheel.

This position is particularly advantageous for said expansion vessel is thus protected against heat radiation from the engine by a valance or baffle plate and from the sun radiation by the wing proper; moreover, this vessel is properly ventilated by the air circulating in the wheel cavity or housing, while being relatively close to the radiator.

Figure 1:
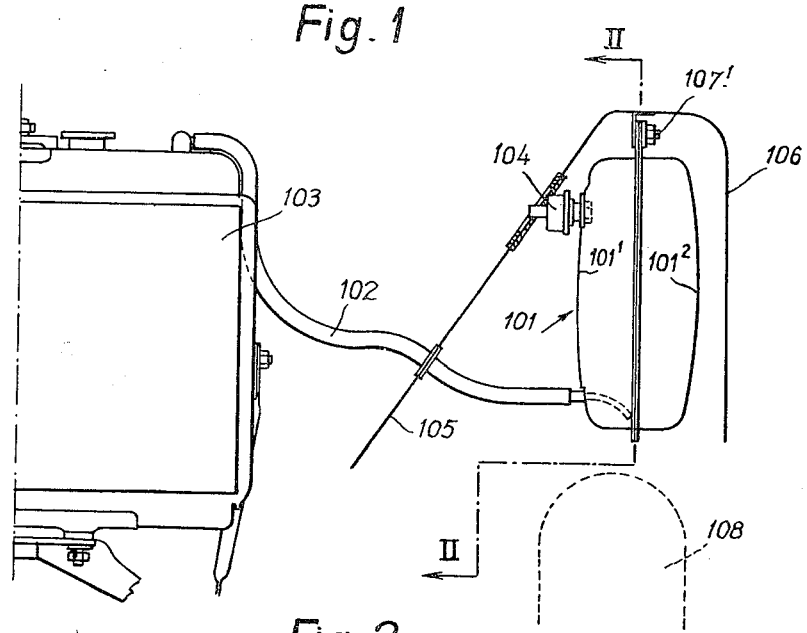
Figure 2:
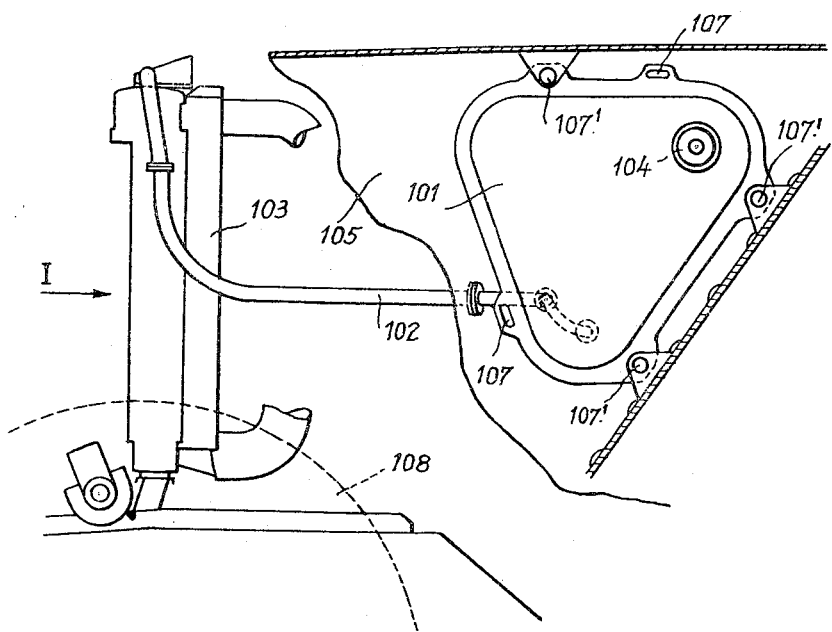

In order to afford a clearer understanding of this invention and of the manner in which it is applicable to a vehicle, for instance a front-engined car in this case, a typical embodiment of the device constituting the subject-matter of this invention will now be described with reference to the accompanying drawing, in which:

FIGURE 1 is a part-sectional view showing the device as seen in an axial direction of the vehicle, that is, in the direction of the arrow I of FIG. 2, and FIGURE 2 is a cross-sectional view taken along lines II—II of FIG. 1.

In the drawing, the reference numeral 101 designates the expansion vessel, 103 is the radiator, 102 the flexible hose connecting the vessel to the radiator, 108 the front wheel having mounted in its wing housing the aforesaid vessel, this housing being bound by the valance or baffle plate 105 and the wing proper 106.

This expansion vessel 101 consists in this example of a pair of pressed shells $101^1$, $101^2$ welded together along their registering flanges and having enlarged portions of these flanges formed with elongated holes or slots 107 permitting the fixation of the vessel by means of bolts $107^1$.

The lower portion of this vessel is connected in a fluid-tight manner to the flexible hose 102.

Moreover, the upper portion of the vessel 101 is connected to a pressure and vacuum responsive valve 104 opening into the engine compartment.

The function of this valve consists on the one hand in avoiding any overpressure in the cooling circuit in case of abnormal heating of the circuit (for constructional reasons the maximum value of this overpressure is of the order of 9 p.s.i.). On the other hand, it will prevent an abnormally high vacuum, during the cooling process, from interfering with the proper operation of the water pump and the thermostat (this value being for example of the order of −.70 to −1 p.s.i.).

When mounting the assembly, the radiator and its flexible hose 102 are filled completely with water and the expansion vessel is filled only to one-fourth of its height. Then the filler plug is closed and sealed.

I claim:

1. A device for preserving the fluid tightness of the hydraulic cooling circuit of a vehicle engine comprising wheel members, fender means disposed over at least one wheel member and including baffle means separating said engine from said one wheel member, expansion vessel means disposed between said fender means and baffle means, radiator means disposed adjacent said one wheel member, and hose means normally filled with liquid interconnecting said radiator means and expansion vessel means so that the point of connection in said expansion vessel means is lower than the point of connection in said radiator means.

2. A device according to claim 1 wherein a pressure and vacuum responsive valve means is disposed in said expansion vessel means which opens into an engine compartment of the vehicle.

3. In a vehicle an engine compartment provided with an engine, a cooling system operatively connected to said engine, wheel members having fender means disposed thereover with one fender means adjacent said engine compartment having baffle means to separate said engine from one wheel member, expansion vessel means disposed between said one fender means and baffle means, and hose means normally filled with liquid interconnecting said cooling system and said expansion vessel means wherein the point of connection of said cooling means is higher than the point of connection of said expansion vessel means.

References Cited by the Examiner
UNITED STATES PATENTS

| | | | |
|---|---|---|---|
| 1,110,606 | 9/14 | Young. | |
| 1,676,045 | 7/28 | Perry | 165—32 |
| 2,086,441 | 7/37 | Rushmore | 123—41.54 X |
| 2,343,145 | 2/44 | Heiney | 165—34 |
| 2,684,123 | 7/54 | Mattis | 180—1 |
| 3,083,701 | 4/63 | Peras | 123—41.54 |

A. HARRY LEVY, *Primary Examiner.*
PHILIP ARNOLD, *Examiner.*